US006770344B2

United States Patent
Moriwaki et al.

(10) Patent No.: US 6,770,344 B2
(45) Date of Patent: Aug. 3, 2004

(54) FUNCTIONAL LAMINATED FILM, ITS PRODUCTION PROCESS AND CRT HAVING SAID FILM ATTACHED THERETO

(75) Inventors: Ken Moriwaki, Chiba (JP); Hideharu Hosoya, Chiba (JP); Masami Suzuki, Chiba (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/251,846

(22) Filed: Sep. 23, 2002

(65) Prior Publication Data

US 2003/0021935 A1 Jan. 30, 2003

Related U.S. Application Data

(63) Continuation of application No. PCT/JP01/02156, filed on Mar. 19, 2001.

(30) Foreign Application Priority Data

Mar. 22, 2000 (JP) ........................................ 2000-080541

(51) Int. Cl.[7] .............................. B32B 9/00; B32B 33/00
(52) U.S. Cl. ............... 428/40.1; 156/272.2; 156/275.5; 156/275.7; 428/40.2; 428/41.3; 428/41.6; 428/41.8; 428/42.1; 428/213
(58) Field of Search ............................... 428/40.1, 40.2, 428/41.3, 41.6, 41.8, 42.1, 213; 156/272.2, 275.5, 275.7

(56) References Cited

U.S. PATENT DOCUMENTS

| 5,691,044 A | 11/1997 | Oyama et al. |
| 5,834,122 A | 11/1998 | Teng et al. |
| 6,165,546 A | 12/2000 | Teng et al. |
| 6,229,252 B1 | 5/2001 | Teng et al. |
| 6,344,710 B2 | 2/2002 | Teng et al. |
| 6,452,331 B1 | 9/2002 | Sakurada et al. |
| 2003/0089516 A1 * | 5/2003 | Hattori .................. 174/66 |

FOREIGN PATENT DOCUMENTS

| JP | 5-182604 | 7/1993 |
| JP | 5-299034 | 11/1993 |
| JP | 6-308614 | 11/1994 |
| JP | 10-177850 | 6/1998 |
| JP | 10-186103 | 7/1998 |
| JP | 10-187506 | 7/1998 |
| JP | 10-334807 | 12/1998 |
| JP | 11-233050 | 8/1999 |
| JP | 11-283530 | 10/1999 |
| JP | 11-283531 | 10/1999 |
| JP | A-11-283531 | 10/1999 |
| JP | 2000-57976 | 2/2000 |
| JP | 2000-182544 | 6/2000 |

* cited by examiner

Primary Examiner—Nasser Ahmad
(74) Attorney, Agent, or Firm—Oblon, Spivak, McClelland, Maier & Neustadt, P.C.

(57) ABSTRACT

It is to provide a functional laminated film which is useful for antireflection on the surface and which can make the brightness of an image uniform, its production process and a CRT having said film attached thereto.

A functional laminated film having an antireflection layer, a substrate film, a colorant layer having a color density distribution and an adhesive layer laminated. A functional laminated film having an antireflection layer, a substrate film and a colored adhesive layer having a color density distribution laminated. A CRT having the above film attached thereto.

20 Claims, 4 Drawing Sheets

ANTIREFLECTION LAYER

SUBSTRATE FILM

COLORANT LAYER

ADHESIVE LAYER

RELEASE FILM

1: SUBSTRATE FILM HAVING ANTIREFLECTION LAYER
2: SUBSTRATE FILM
3: FORMATION OF COLORANT LAYER HAVING UNIFORM COLOR DENSITY
4: FORMATION OF COLORED ADHESIVE LAYER HAVING UNIFORM COLOR DENSITY
5: FORMATION OF COLORANT LAYER HAVING COLOR DENSITY DISTRIBUTION
6: IRRADIATION WITH ULTRAVIOLET RAYS
7: LAMINATION OF ADHESIVE LAYER HAVING RELEASE FILM
8: LAMINATION OF RELEASE FILM
9: FORMATION OF ANTIREFLECTION LAYER

FUNCTIONAL LAMINATED FILM, ITS PRODUCTION PROCESS AND CRT HAVING SAID FILM ATTACHED THERETO

TECHNICAL FIELD

The present invention relates to a cathode ray tube (hereinafter sometimes referred to simply as "CRT") excellent in uniformity in brightness of an image. More particularly, it relates to a functional film which imparts such functions to a CRT and its production process.

BACKGROUND ART

It is required for a CRT that the brightness of an image displayed in its screen is uniform.

As a method to make the brightness of an image uniform, (1) a method wherein the transmittance of light of a panel glass is made constant in the plane, and (2) a method wherein, while a transmittance distribution of light is permitted to be present in the panel glass, it is corrected by an intensity distribution of an electron beam, and a distribution is imparted to the emission intensity of a phosphor, have been proposed.

However, as the former method (1), it has been attempted to overcome the difference in transmittance of light due to the thickness of glass by improving the transmittance of light of the glass base, however, the significant difference in thickness between the center portion and the peripheral portion of the panel glass, corresponding to flattening of the panel glass in recent years, can not adequately be overcome.

The latter method (2) has a technical limit such that when a panel glass has a significant difference in transmittance of light, such as a difference in transmittance of light of at least 10%, it can not cope therewith, and it has been difficult to achieve uniformity in brightness over the entire plane of the panel glass.

Further, as another related technology, JP-A-61-185852 discloses a method wherein the total glass thickness within the display area is made constant by attaching a front panel made of glass and provided with a thickness variation to the front surface of the panel glass by a resin. However, this method has had a problem that the weight of CRT increases. Further, a requirement for antireflection on the surface of the panel glass is increasing in recent years.

The present invention has been made to overcome such problems, and it is an object of the present invention to provide a functional laminated film which can prevent reflection on the surface, and which can make the brightness of an image uniform, particularly regarding a CRT corresponding to flattening in recent years, and its production process.

DISCLOSURE OF THE INVENTION

The above object can be overcome by the following means. That is:

(1) A functional laminated film comprising a substrate film, an antireflection layer provided on one side of the substrate film, a colorant layer having a color density distribution provided on the other side of said substrate film, and an adhesive layer laminated on said colorant layer side.

(2) A functional laminated film comprising a substrate film, an antireflection layer provided on one side of the substrate film, and a colored adhesive layer having a color density distribution provided on the other side of said substrate film.

(3) A process for producing the functional laminated film as defined in the above (1), which comprises providing an antireflection layer on one side of a substrate film, providing a colorant layer having a uniform color density on the other side of said substrate film, irradiating said colorant layer with ultraviolet rays by means of a mask having a distribution of the transmission amount of ultraviolet rays to form a colorant layer having a color density distribution, and laminating an adhesive layer on said colorant layer.

(4) A process for producing the functional laminated film as defined in the above (1), which comprises providing an antireflection layer on one side of a substrate film, providing a colorant layer having a uniform color density on the other side of said substrate film, laminating an adhesive layer on said colorant layer, and irradiating said colorant layer with ultraviolet rays by means of a mask having a distribution of the transmission amount of ultraviolet rays to form a colorant layer having a color density distribution.

(5) A process for producing the functional laminated film as defined in the above (2), which comprises providing an antireflection layer on one side of a substrate film, providing a colored adhesive layer having a uniform color density on the other side of said substrate film, and irradiating said colored adhesive layer with ultraviolet rays by means of a mask having a distribution of the transmission amount of ultraviolet rays to form a colored adhesive layer having a color density distribution.

(6) A process for producing the functional laminated film as defined in the above (2), which comprises providing an antireflection layer on one side of a substrate film, providing a colored adhesive layer having a uniform color density on the other side of said substrate film, laminating a release film on said colored adhesive layer, and then irradiating said colored adhesive layer with ultraviolet rays by means of a mask having a distribution of the transmission amount of ultraviolet rays to form a colored adhesive layer having a color density distribution.

(7) A CRT comprising the functional laminated film as defined in the above (1) or (2) attached thereto.

BEST MODE FOR CARRYING OUT THE INVENTION

Now, the constituents of the functional laminated film of the present invention will be explained in detail.

The substrate film may, for example, be a polyester film (such as a PET (polyethylene terephthalate) film), a polycarbonate film or a triacetate film. The film thickness is preferably at a level of from 20 to 200 μm.

In order to protect the colorant layer from ultraviolet rays, one having an ultraviolet ray absorbent incorporated thereinto by blending or coating is preferred.

Further, a hard coat is preferably applied to the substrate film for prevention of scars. The resin used for the hard coat may, for example, be a photo-setting resin which is cured by ultraviolet rays or electron rays, or a silicone type resin which is cured by heating.

Further, it is preferred to carry out e.g. a corona discharge treatment, a plasma treatment or a treatment of coating organosiloxane and drying, before the antireflection treatment layer is formed, with a purpose of improving adhesion properties of the antireflection treatment layer. In a case where a hard coat is applied to the substrate film, a corona discharge treatment or a plasma treatment is carried out on the hard coat surface.

The antireflection layer may have e.g. the following constructions.

(1) A construction wherein a light-absorbing film and a low refractive index film are formed in this order on a substrate film.

(2) A construction wherein a light-absorbing film, an oxidation barrier film (a film which prevents oxidation of the light-absorbing film) and a low refractive index film are formed in this order on a substrate film.

For the above light-absorbing film, it is preferred to employ a material which substantially reduces the surface reflectance to outer light by a light interference effect with the low refractive index layer formed in contact therewith, whereby the contrast of an image on the panel glass will be excellent.

The functional laminated film of the present invention preferably has a luminous reflectance (No. 04063 of JIS Z8113) to light incident from the antireflection layer side (i.e. the side of an observer who observes the image) of preferably at most 2.0%, particularly preferably at most 1.5%.

Further, the light-absorbing film is preferably electrically conductive. Due to the electrical conductivity, an antistatic effect of CRT or prevention of leakage of electromagnetic waves from the interior of CRT can be attained, such being desirable.

By using an electrically conductive light-absorbing film, electrical conductivity can be imparted to the functional laminated film of the present invention. The functional laminated film of the present invention has a surface resistance value of preferably at most 5 k$\Omega$/□, particularly preferably at most 2 k$\Omega$/□, as measured by a four-probe method.

As an electrically conductive light-absorbing film which satisfies such characteristics, one containing at least one metal selected from the group consisting of gold, copper, titanium, zirconium and hafnium, or a nitride of such a metal, as the main component, may, for example, be mentioned.

Among them, one containing a nitride of at least one metal selected from the group consisting of titanium, zirconium and hafnium, as the main component, is preferred from the viewpoint of the refractive index in the visible light region and from the dispersion relation of an attenuation coefficient, and it has a characteristic that the low reflection region in the visible light region against light (outer light) from the film side will be broadened by the light interference action with the low refractive index film as an upper layer, depending upon the value of its optical constant. Further, the film containing, as the main component, a nitride of at least one metal selected from the group consisting of titanium, zirconium and hafnium, is preferred also from the viewpoint of the heat resistance, the chemical resistance or the abrasion resistance.

In a case where two or more materials are used for the light-absorbing film, (1) they may be employed as a composite material, or (2) films made of different materials may be laminated so that the total film thickness (the geometrical film thickness, the same applies hereinafter) will preferably be from 5 to 25 nm.

Further, a light-absorbing film containing titanium nitride as the main component, is particularly preferred also from the viewpoint of the productivity and from the viewpoint of the reproducibility, since the value of its optical constant in a visible light region matches well with a film containing silica as the main component (hereinafter sometimes referred to as a silica film) to reduce the reflectance, and the value of the absorption coefficient is proper, and the film thickness to obtain a proper light absorbance will be within the range of from a few nm to a few tens nm.

Further, as the low refractive index film, a film having a refractive index of from 1.35 to 1.7, is preferred. Specifically, a film containing silica as the main component (hereinafter sometimes referred to as a silica film) having a refractive index of from 1.46 to 1.52, particularly preferably from 1.46 to 1.47, is preferred. Also from the viewpoint of the mechanical and chemical durability, the silica film is preferably employed.

The film thickness of the low refractive index film is preferably from 70 to 130 nm, whereby the low reflection wavelength region can be adjusted to the center portion of the visible light region. The film thickness of the low refractive index film is particularly preferably more than 80 nm and at most 120 nm. If the film thickness of the low refractive index film is not more than 80 nm, the reflectance on the long wavelength side tends to be large, and if it exceeds 120 nm, the rising of the reflectance on the short wavelength side tends to shift towards the long wavelength side.

It may happen that the desired properties cannot be obtained for a reason such that at the time of forming a low refractive index film (such as a silica film) after forming the light-absorbing film on the substrate film, said light absorbing film undergoes oxidation, or said light absorbing film undergoes oxidation in the heat treatment after the film forming.

In such a case, a layer to prevent oxidation of the light-absorbing film (hereinafter referred to as an oxidation barrier layer) may be inserted between the light-absorbing film and the low refractive index film, whereby oxidation during the film forming can be prevented, and the heat resistance can be improved.

An oxidation barrier layer of this type is commonly used in so-called Low-E glass employing a silver film. For example, U.S. Pat. No. 4,548,691 and JP-A-59-165001 disclose an oxidation barrier layer formed for the purpose of preventing oxidation of a silver film during the film formation of an oxide film to be formed on the silver film. Thus, this oxidation barrier layer is a thin film formed to prevent oxidation of another layer formed therebeneath and accordingly has optically no significance.

As such an oxidation barrier layer, various metal films or metal nitride films may be employed. The film thickness is preferably at most 20 nm not to impair the inherent antireflection performance. Further, if the film thickness of this oxidation barrier layer is less than 1 nm, improvement of the heat resistance tends to be inadequate. Accordingly, it is preferred to insert an oxidation barrier layer having a film thickness of from 1 to 20 nm, whereby the heat resistance can effectively be improved.

As described above, this oxidation barrier layer has optically no significance and is a layer which is not required optically. Accordingly, it may happen that by the insertion of this layer, the antireflection performance against outer light deteriorates. Especially when the oxidation barrier layer is light absorptive (such as light-absorptive silicon), the thickness of the oxidation barrier layer is preferably at most about 5 nm from the viewpoint of the antireflection performance.

In a case where a transparent oxidation barrier layer is employed, the allowable film thickness varies depending upon the refractive index of this layer. When a material having a refractive index of about 2.0 (such as silicon nitride or aluminum nitride) is employed, the allowable film thickness becomes maximum, and a barrier layer of up to about 20 nm may be inserted between the light-absorbing film as a lower layer and the silica film layer as an upper layer, while maintaining the low reflection characteristic against outer light.

As the oxidation barrier layer, it is preferred to employ a film containing, as the main component, at least one metal selected from the group consisting of chromium, molybdenum, tungsten, vanadium, niobium, tantalum, zinc, nickel, palladium, platinum, aluminum, indium, tin and silicon or a film containing a nitride thereof as the main component, or a film containing, as the main component, at least one metal selected from the group consisting of titanium, zirconium and hafnium, whereby adequate improvement of the oxidation-preventing performance and maintenance of the excellent antireflection characteristic, can both be attained.

Especially, a film containing silicon as the main component or a film containing silicon nitride as the main component, is excellent in the oxidation barrier performance, and it is advantageous from the viewpoint of the production in that it is not required to increase the target material when the upper layer silica film is formed by sputtering by means of a conductive Si target.

The colorant constituting the colorant layer may be an organic industrial coloring matter represented by a dye or a pigment, and a dye or a pigment or a mixture thereof is selected taking compatibility with a binder or a solvent or solubility into consideration.

The dye may, for example, be an azo type dye, an anthraquinone type dye, an indigoid type dye, a sulfide type dye, a triphenylmethane type dye, a pyrazolone type dye, a stilbene type dye, a diphenylmethane type dye, a xanthein type dye, an alizarin type dye, an acridine type dye, a quinonimine type dye, a thiazole type dye, a methine type dye, a nitro type dye, a nitroso type dye, a cyanine type dye or a mixture thereof.

The pigment may, for example, be a phthalocyanine type, a naphthalocyanine type, a dioxazine type, an anthraquinone type or a mixture thereof.

Usually the colorant layer is constituted of the colorant and a binder resin. The binder resin may, for example, be an acryl type resin, a silicone type resin, a polyester type resin, a cellulose type resin, a urethane type resin, a styrene type resin, a polycarbonate type resin, a vinyl acetate type resin, a vinyl alcohol type resin or a copolymer type resin thereof.

As the above binder resin, an acryl resin, a urethane resin or a polyester resin is particularly preferred. The colorant is dissolved or dispersed in the binder resin to form the colorant layer.

Further, also as the colorant constituting the colored adhesive layer, the above colorant may be mentioned.

The optimum thickness of the colorant layer varies depending upon the method of coating, and in a case of continuous coating by a common gravure method, the film thickness after curing is preferably from 0.2 to 5 $\mu$m. In a method of imparting a density distribution by changing the film thickness without using e.g. ultraviolet rays, as mentioned hereinafter, the film thickness is substantially 0 at a thin part.

The content of the colorant in the colorant layer is preferably within 10 mass % based on the resin solid content.

In order to achieve the effect of the present invention, the colorant layer or the colored adhesive layer preferably has a color density distribution, whereby uniformity in brightness of an image can be achieved. Namely, in order to achieve flattening of the panel glass, the panel glass is designed so that it is thicker at the peripheral portion than the center portion. As a result, the brightness of an image is lower at the peripheral portion than the center portion of the screen, corresponding to the transmittance of light of the panel glass. Accordingly, by attaching the functional laminated film of the present invention to the panel glass so that the transmittance of light is low at the center portion and is high at the peripheral portion, the transmittance of light becomes uniform on the entire panel glass plane, and the brightness of an image becomes uniform.

The functional laminated film of the present invention preferably has a luminous transmittance (according to No. 04066 of JIS Z8113) of preferably from 30 to 85%, particularly preferably from 40 to 80%, furthermore preferably from 45 to 75%. Further, with respect to the functional laminated film of the present invention, the luminous transmittance of a laminate comprising the substrate film and the antireflection layer alone is preferably at least 50%. If it is less than 50%, the density distribution adjustment by the colorant layer or the colored adhesive layer tends to be difficult.

As the adhesive component of the adhesive layer, an acryl type, a urethane type, a polyester type, an epoxy type or a polyether type may, for example, be used. In the case of the colored adhesive layer, the film thickness is preferably from 10 to 35 $\mu$m, particularly preferably from 20 to 30 $\mu$m, so as to achieve the adhesive characteristics. In such a case, the content of the colorant in the colored adhesive layer is preferably within 5 mass % based on the adhesive solid content.

The adhesive layer may, for example, be a transparent adhesive film AD-ROC, AD-20 or AD-C2, manufactured by Polatechno Co., Ltd., or HJ-9150W or HJ-3160W manufactured by Nitto Denko Corporation. In such a case, the adhesive preferably contains an ultraviolet ray absorbent to protect the adhesive layer from ultraviolet rays.

The colored adhesive layer can be prepared by incorporating a colorant into the adhesive. The adhesive may, for example, be SK-DYNE 1831 or 1425 manufactured by Soken Chemical & Engineering Co., Ltd., or Nikazol PE154 or KP1581, manufactured by NIPPON CARBIDE INDUSTRIES CO., INC.

The release film preferably transmits ultraviolet rays taking irradiation with ultraviolet rays into consideration, and for example, a fluorine type resin film such as AFLEX film manufactured by Asahi Glass Company, Limited or SKYLEADER manufactured by Toray Industries, Inc., or a film obtained by subjecting a polypropylene film (OPP) or a polyester film (PET) to a release treatment with a silicone type, may suitably be used.

Figure 1A:
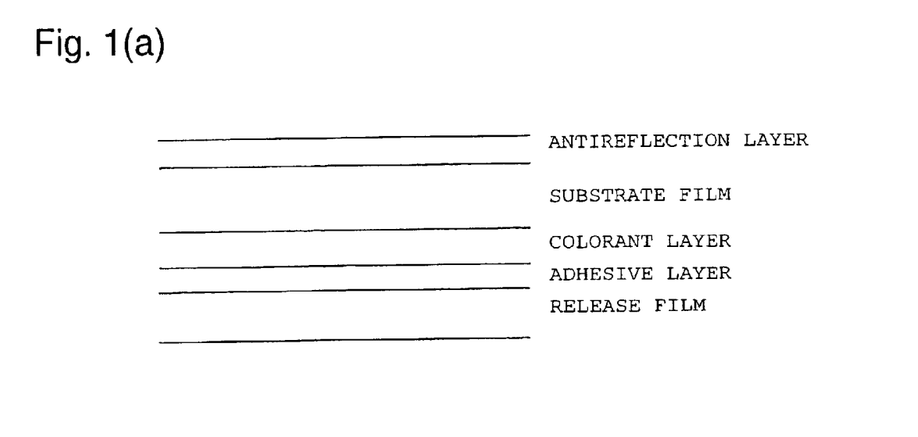
FIG. 1: A schematic diagram illustrating the cross section of a functional laminated film of the present invention.
Figure 1B:
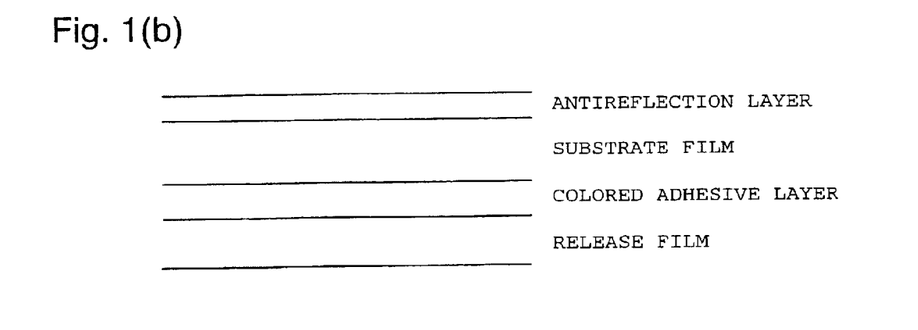

The functional laminated film of the present invention (the sectional view is schematically shown in FIG. 1. One having a release film is exemplified) is constituted of the above layers, and is (1) a functional laminated film wherein an antireflection layer is formed on one side of a substrate film, a colorant layer having a color density distribution is formed on the other side of said substrate film, and an adhesive layer is laminated on said colorant layer side, or (2) a functional laminated film wherein an antireflection layer is formed on one side of a substrate film, and a colored adhesive layer having a color density distribution is provided on the other side of said substrate film.

The functional laminated film of the present invention has the colorant layer (or the colored adhesive layer) formed on the substrate film opposite to the antireflection layer. The functional laminated film of the present invention is used so that the antireflection layer is on the observer side, and the colorant layer (or the colored adhesive layer) is on the display device (such as cathode ray tube) side. Accordingly, light (particularly ultraviolet rays) from the outside passes through the substrate film and reaches the colorant layer (or the colored adhesive layer), whereby color fading or deterioration due to light (particularly ultraviolet rays) tends to be small because of adsorption of light (particularly ultraviolet rays) by the substrate film.

The substrate film is preferably such a material that the substrate film itself absorbs ultraviolet rays (such as a PET film), and it is more preferably a film having an ultraviolet ray absorbent incorporated thereinto or a film having ultraviolet ray absorption coating applied thereto.

The film having an ultraviolet ray absorbent incorporated thereinto may be obtained by blending a common organic ultraviolet ray absorbent of benzophenone type or benzotriazole type in an appropriate amount with the substrate film, followed by e.g. extrusion to form a film. The film having ultraviolet ray absorption coating applied thereto may be obtained by uniformly coating the substrate film with an ultraviolet ray shielding coating obtained by dissolving a common organic ultraviolet ray absorbent in a transparent resin solution having e.g. an acryl resin dissolved in an organic solvent, to form an ultraviolet ray shielding layer.

Now, the process for producing the functional laminated film of the present invention will be explained in detail below.

The functional laminated film of the present invention is produced by (A) a process which comprises providing an antireflection layer on one side of a substrate film, providing a colorant layer having a uniform color density on the other side of said substrate film, and (a1) irradiating said colorant layer with ultraviolet rays by means of a mask having a distribution of the transmission amount of ultraviolet rays, and laminating an adhesive layer on said colorant layer, or (a2) laminating an adhesive layer on said colorant layer, and irradiating said colorant layer with ultraviolet rays by means of a mask having a distribution of the transmission amount of ultraviolet rays, (B) a process which comprises providing an antireflection layer on one side of a substrate film, providing a colored adhesive layer having a uniform color density on the other side of said substrate film, and (b1) irradiating said colored adhesive layer with ultraviolet rays by means of a mask having a distribution of the transmission amount of ultraviolet rays to form a colored adhesive layer having a color density distribution, or (b2) laminating a release film on said colored adhesive layer, and irradiating said colored adhesive layer with ultraviolet rays by means of a mask having a distribution of the transmission amount of ultraviolet rays to form a colored adhesive layer having a color density distribution, (C) a process which comprises providing an antireflection layer on one side of a substrate film, providing a colorant layer having a color density distribution on the other side of said substrate film, and then laminating an adhesive layer on said colorant layer side, or (D) a process which comprises providing a colorant layer having a color density distribution on one side of a substrate film, providing an antireflection layer on the other side of said substrate film, and laminating an adhesive layer on said colorant layer side.

In the above (A), in the step of laminating an adhesive layer on the colorant layer, the adhesive layer may have a release film or not.

Figure 2:
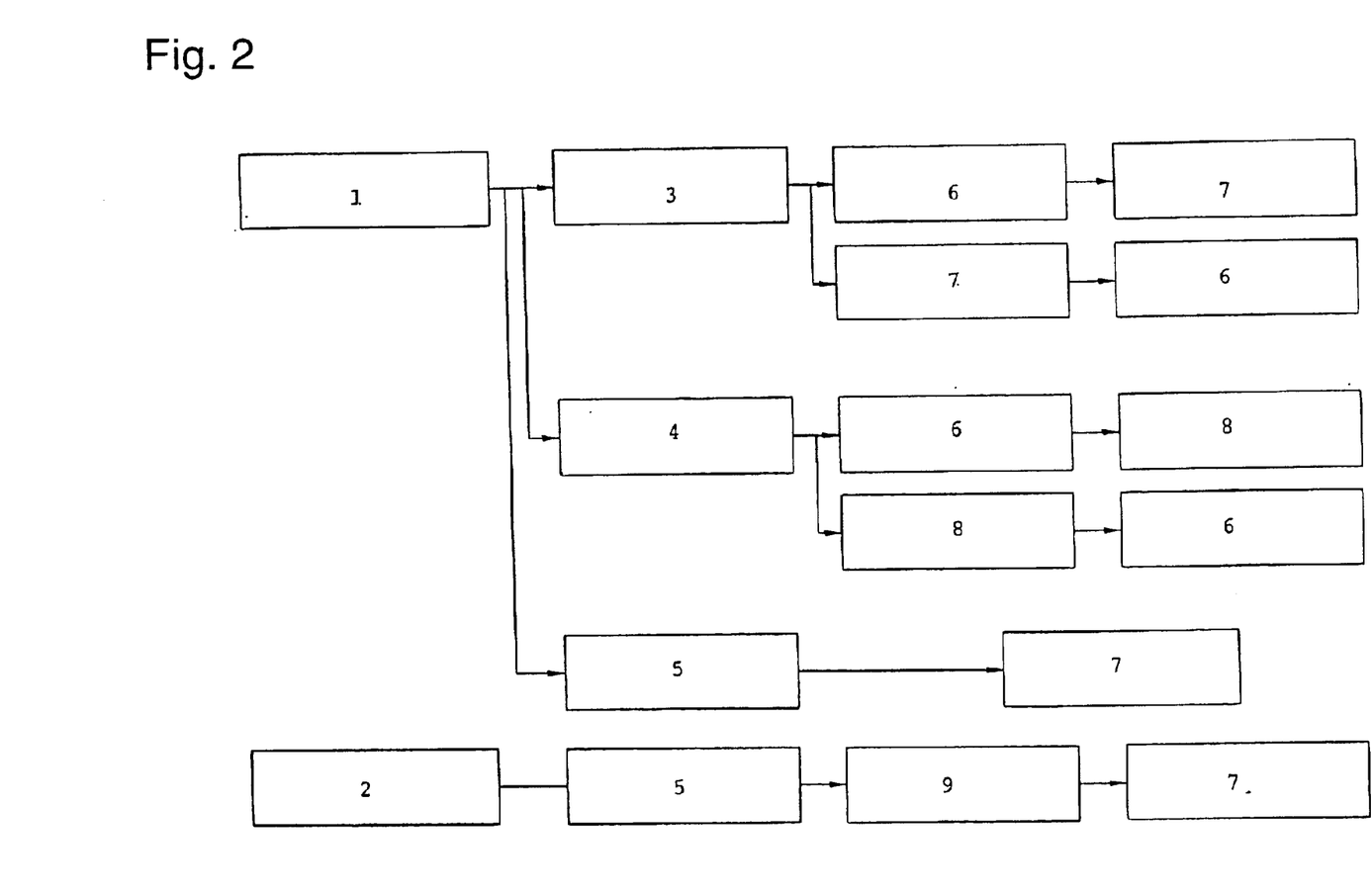
FIG. 2: A schematic flowchart illustrating production processes of a functional laminated film of the present invention.

The schematic flowchart of these production processes is shown in FIG. 2. In Fig., the adhesive layer having a release film may be an adhesive layer alone.

At this time, the substrate film having the antireflection layer preliminarily formed thereon or the substrate film alone is supplied in the form of a roll, and it is subjected to a series of steps such as formation of the colorant layer while unwinding it, and then an adhesive film (adhesive layer) having a release film is laminated thereon, or in a case where an adhesive layer is formed on the substrate film by coating or printing, the release film alone is supplied in the form of a roll thereon, and while unwinding it, the adhesive layer having the release film is laminated. It is preferred to continuously cut the functional laminated film of the present invention thus obtained into a predetermined dimension, in view of productivity. The functional laminated film of the present invention may be stored in the form of a roll without providing a release film so that the adhesive layer and the antireflection layer are contacted.

In this continuous production, if the unwinding of the roll is carried out continuously without a break, a color density distribution is provided in a direction perpendicular to the advancing direction of the roll, and by intermittently unwinding the roll, it is possible to provide a color density distribution in the advancing direction of the roll in addition to the perpendicular direction.

Further, slitting into multiple strips such as slitting into two strips or slitting into three strips is possible, thus further increasing the productivity.

Among production processes of the present invention, in the above A), B) and C), the colorant layer or the colored adhesive layer is formed after the antireflection layer is provided, and accordingly if the antireflection layer is formed by sputtering for example, coloring property will not be changed by heat at the time of film formation.

The antireflection layer may be preliminarily formed on the substrate film, or it may be provided after the colorant layer is provided on the substrate film.

As a means to form the antireflection layer on the substrate film, a sputtering method, an ion plating method, a vacuum vapor deposition method or a CVD method may, for example, be employed. Among them, a sputtering method or a vacuum vapor deposition method is preferred, since the film thickness distribution can easily be corrected, and film formation over a large area is easy. It is particularly preferred to employ an inline type sputtering method excellent in the productivity, since a good film quality, and uniformity of the film quality can easily be attained. Further, from the viewpoint of the productivity, a DC (direct current) magnetron type sputtering method is preferred, whereby modification of the apparatus to a large size is easy.

In a case where one containing a metal nitride as the main component, is used as the light-absorbing film, if a film containing a nitride as the main component is used as the oxidation barrier layer, the light-absorbing film and the oxidation barrier layer can be formed by sputtering in the same gas atmosphere. This is a substantial merit, when a film forming installation for practical sputtering is considered.

Namely, when a so-called inline type sputtering apparatus excellent in the mass production is taken into consideration, such a light-absorbing film and an oxidation barrier layer can be formed within the same chamber (hereinafter referred to as chamber A). Accordingly, a chamber for gas separation may be formed only between chamber A and a chamber for forming a silica film to be formed as an upper layer, such being very efficient.

Especially when a film containing titanium nitride as the main component is used as the light-absorbing film, and silicon nitride is used as the oxidation barrier layer, an effect of improving the adhesive strength of the silica film as the outermost layer with the titanium nitride film, will also be obtained.

When the antireflection layer is attached to a CRT as an ultimate purpose of the functional laminated film of the present invention, it is an outermost surface of the CRT, and accordingly it is preferred to protect the surface with e.g. a slip sheet, in a wound state in a roll or in a piled state after cutting. Further, an adhesive protective film which does not impair the antireflection layer may be provided.

As a method for providing the colorant layer having a color density distribution on the substrate film, the following two methods are preferably employed.

A first one is a method which comprises providing an entirely uniformly continuous colorant layer having a uniform color density on the substrate film, irradiating said colorant layer with ultraviolet rays by means of a mask having a distribution of the transmission amount of ultraviolet rays so that the colorant undergoes color fading depending upon the intensity distribution of ultraviolet rays transmitted through said mask to obtain a desired color density distribution.

As a method for providing the entirely uniformly continuous colorant layer having a uniform color density, a method by a roll coater, a bar coater, a gravure coater, a doctor type blade coater or a spray coater may, for example, be mentioned.

As the mask having a distribution of the transmission amount of ultraviolet rays, a material which can control transmission or diffusion of ultraviolet rays and which is less likely to be deteriorated by ultraviolet rays is selected. As an inorganic material, quartz glass is preferred, and as an organic material, a fluorine type resin sheet or film is preferred. Among fluororesins, a polytetrafluoroethylene resin is opaque to ultraviolet rays and thereby does not answer to the purpose. A thermoplastic fluororesin which is transparent, with which depressions and protrusions can relatively easily be formed on the surface of the film, and which can impart light diffusion characteristics, is preferred. Specifically, a tetrafluoroethylene-perfluoro (alkyl vinyl ether) type copolymer resin (PFA), a tetrafluoroethylene-hexafluoropropylene type copolymer resin (FEP), a poly (vinylidene fluoride) (PVDF) resin or an ethylene-tetrafluoroethylene type copolymer resin (ETFE) may, for example, be mentioned. Particularly preferred is ETFE, and for example, a method of laminating a plurality of AFLEX 100N (manufactured by Asahi Glass Company, Limited) depending upon a desired transmission amount distribution to adjust the transmission amount or the diffusion amount of ultraviolet rays by the optical path length of ultraviolet rays in the film, is suitable.

As an ultraviolet ray source, a general ultraviolet lamp may be used, however, a metal halide lamp or a mercury lamp is preferred, taking the energy applied to the colorant layer into consideration. In such a case, it is more preferred to interpose a long wavelength cut filter (254 filter) between the ultraviolet ray source and the colorant layer so as to suppress increase in the temperature by irradiation. The ultraviolet lamp is preferably one having a power output at a level of from 80 to 300 W/cm, considering heat deterioration of the substrate film and the color fading effect of the colorant.

The energy applied to the colorant layer is significantly influenced not only by the power output of the ultraviolet lamp but also by the distance from the ultraviolet lamp and the irradiation time, and the degree of color fading of the colorant layer can be increased by shortening the distance between the ultraviolet lamp and the colorant layer or by increasing the irradiation time. Practically, these irradiation conditions are suitably selected depending upon the requirement of the degree of color fading of the colorant layer.

A second method is a method of providing a colorant layer having a desired color density distribution as the colorant layer, and it can be carried out by e.g. screen printing, flexographic printing of gravure printing, offset printing, relief printing or ink jet system.

By attaching the functional laminated film of the present invention cut into a predetermined dimension to a CRT, the CRT of the present invention can be obtained.

The applicable CRT has characteristics depending upon the manufacturer, but a high effect can be obtained particularly when the film is bonded to a dot matrix flat type CRT wherein the difference in thickness between the center portion of the CRT and the peripheral portion is significant. Particularly, a CRT wherein the curvature on the CRT outer surface is substantially in one direction, i.e. a cylindrical CRT is preferred, and in a case where a CRT has a curvature in two directions, a CRT having a curvature radius in a diagonal axis direction of at least 1000 mm is preferred.

EXAMPLES

Now, the present invention will be explained with reference to Examples, however, the present invention is by no means restricted to such Examples.

Example 1 and Comparative Example

Preparation of Antireflection Film

As a substrate film, a PET film subjected to a hard coat treatment (Toughtop C0T0, manufactured by Toray Industries Inc., thickness: about 190 μm) was used. In the present Example, a plasma treatment was carried out as a pretreatment so as to further increase adhesion between the hard coat treated surface and an antireflection film. Then, on the hard coat subjected to the plasma treatment, a titanium nitride film (light-absorbing film), a silicon nitride film (oxidation barrier layer) and a silica film (low refractive index film) were formed in this order from the substrate film (PET film) side by a sputtering method.

Each film thickness was 12.0 nm (titanium nitride film), 5.0 nm (silicon nitride film) or 85.0 nm (silica film).

The actual film formation was carried out as follows. Using an inline type sputtering apparatus, a metal titanium target for forming a titanium nitride film and a boron-doped silicon target for forming a silicon nitride film were installed in a first vacuum chamber. In a second vacuum chamber, a boron-doped silicon target for forming a silica film was installed. The cleaned substrate film was installed in the chamber, so that the long axial direction was an up and down direction (a direction perpendicular to the advancing direction), and the entire back pressure was reduced to a level of $2 \times 10^{-3}$ Pa.

Then, in the first vacuum chamber, a mixed gas of argon and nitrogen (nitrogen being 20 vol %) was introduced as a discharge gas, and as the discharge pressure, conductance was set at $4 \times 10^{-1}$ Pa. Then, a negative direct current voltage (power density: about 4.0 W/cm$^2$) was applied to the titanium target, and a titanium nitride film was formed. Then, in the same atmosphere, a negative direct current voltage (power density: about 1.5 W/cm$^2$) was applied to the silicon target via a pulsed module (a module to make the voltage to have a pulse waveform), and a silicon nitride film was formed. With respect to the formed titanium nitride film, the film composition was analyzed by ESCA, whereby Ti:N:O (atomic ratio) was 1.0:0.95:0.05.

Then, the substrate film was transferred to the second vacuum chamber, and into the highly vacuumed chamber, a mixed gas of argon and oxygen (oxygen being about 30 vol %) was introduced and the conductance was set to be $3 \times 10^{-1}$ Pa. Then, the power was applied to the silicon target by means of an AC power source (power density: about 6.0 W/cm$^2$) to form a silica film (refractive index n=1.47). The obtained film provided with the antireflection film had a luminous transmittance of from 69.3 to 69.9%, and a luminous reflectance (reflectance on the antireflection film surface side) of from 0.14 to 0.21%. Further, the surface resistance value was 900 $\Omega/\square$ as measured by a four-probe method.

Preparation of Functional Laminated Film

10 Parts by mass of an acryl resin (Dianal BR60, manufactured by Mitsubishi Rayon Co., Ltd.) and 0.3 part by mass of a colorant (Barifast 3840, manufactured by Orient Kagaku) were dissolved in a solvent (MEK50:50 parts by mass, toluene: 40 parts by mass) to prepare a colored coating.

The side of the PET film provided with the antireflection film by the above sputtering method, where the antireflection film was not provided, was coated with the colored coating uniformly in a thickness of about 20 μm by a roll coater. After coating, heating at 100° C. was carried out for 10 minutes to evaporate the solvent, to obtain a colorant layer having a dried film thickness of about 2 μm.

The colorant layer of this colored film was irradiated with 120 W/cm of ultraviolet rays from a mercury lamp having a emission length of 250 nm and a total power output of 3000 W. A 254 filter as a long wavelength cut filter was interposed between the mercury lamp and the film, and further, a mask for correcting the transmission amount of ultraviolet rays was used with a purpose of adjusting the irradiation amount of ultraviolet rays. This mask was so devised that fluorine type films (AFLEX 100N, manufactured by Asahi Glass Company, Limited) were overlaid so that the center portion would be particularly thick and the peripheral portion would be thin in order that the color fading of the colorant layer due to ultraviolet rays would be weak at the center portion and significant at the peripheral portion. The distance between the mercury lamp and the mask was held at 180 mm and the distance between the mask and the film surface was held at 10 mm, and irradiation for about 1 minute was carried out to obtain a colored film having a difference in the luminous transmittance between the center portion and the peripheral portion.

Then, a release film on one side of a commercially available transparent adhesive film (AD-ROC, manufactured by Polatechno CO., Ltd.) was peeled, and the adhesive film was bonded to the colorant layer surface on the above obtained colored film having a high luminous transmittance at the peripheral portion, by means of the adhesive layer while lightly pressing the films with a rubber roll to prepare a functional laminated film of the present invention.

The obtained functional laminated film of the present invention is taken as Example 1, and a film prepared in the same manner except that the color fading at the peripheral portion of the colorant layer by irradiation with ultraviolet rays from a mercury lamp was not carried out, is taken as Comparative Example, and the luminous transmittance distributions of them were measured by means of a spectrophotometer UV-3100PC, manufactured by Shimadzu Corporation. The luminous reflectance (reflectance on the antireflection film side) of the obtained functional laminated film was 1.1%.

Figure 3:
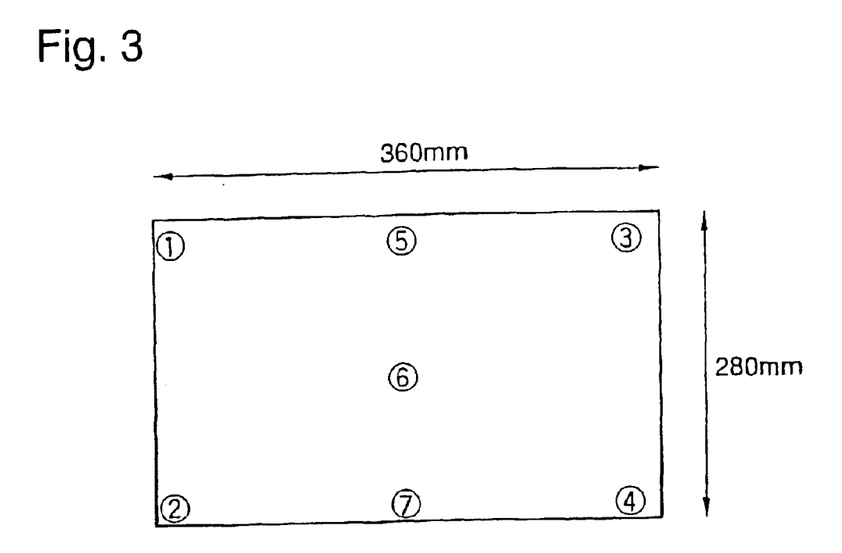
FIG. 3: A diagram illustrating the location of measurement of the luminous transmittance of a functional laminated film and the brightness of an image of a CRT.

Further, each of these films was attached to a 17 inch dot matrix flat type CRT, to which a surface treatment for correction the transmittance was not applied. The curvature radius on the surface of the used CRT was at least 10000 mm. The brightness distribution of the CRT after attachment was measured by means of a spectral radiance type (CS-1000, manufactured by Minolta Co., Ltd.) in a dark room. The measurement results of the luminance transmittance distribution and the measurement results of the brightness distribution are shown in Tables 1 and 2, respectively. The measurement positions of the luminance transmittance and the brightness were as shown in FIG. 3.

For comparison, the PET film provided with a hard coat used in Example 1 was preliminarily immersed and dyed in a solvent using the colorant used in Example 1, to prepare a colored film. On this colored film, an antireflection film was formed in the same manner as in Example 1, whereupon discoloration after the film formation by sputtering was significant. This is estimated to be because the colorant underwent heat deterioration by heat applied to the film substrate at the time of sputtering.

Example 2

0.09 Parts by mass of the colorant used in Example 1 was added to 100 parts by mass of an acryl resin type adhesive (SK-DYNE 1831, manufactured by Soken Chemical & Engineering Co., Ltd., resin solid content: 30%), and an appropriate amount of a solvent MEK for correcting the viscosity was mixed therewith to prepare a colored adhesive solution. The side of the film provided with the antireflection film prepared in Example 1, where the antireflection film was not provided, was uniformly coated with the solution so that the dried film thickness after evaporation of the solvent would be about 20 μm, by means of a roll coater in the same manner as in Example 1 to form a colored adhesive layer. With a purpose of preventing the colored adhesive layer, a fluororesin film (AFLEX film, manufactured by Asahi Glass Company, Limited) having a thickness of 25 μm as a release film was bonded to obtain a laminated film having the colored adhesive layer.

This film was irradiated with ultraviolet rays by a mercury lamp in the same manner as in Example 1 to prepare a functional laminated film of the present invention having an increased luminous transmittance at the peripheral portion. However, since the film was irradiated with ultraviolet rays through the release film, it took longer than Example 1 to obtain a desired luminous transmittance, and irradiation for about 5 minutes was required. The fluororesin film having a thickness of 25 μm (AFLEX film, manufactured by Asahi Glass Company, Limited) had a release property from the adhesive, and it could easily be peeled from the colored adhesive layer after irradiation.

The luminous transmittance of the functional laminated film of the present invention thus prepared was measured in the same manner as in Example 1. Further, this film was attached to a 17 inch dot matrix flat type CRT in the same manner as in Example 1, and the brightness distribution was measured in the same manner as in Example 1. The measurement results of the transmittance distribution and the measurement results of the brightness distribution are shown in Tables 1 and 2, respectively.

Example 3

One side of a polyester film (LUMINAR, manufactured by Toray Industries, Inc., thickness: 188 μm) as a substrate was coated with a polyfunctional acryl type ultraviolet curable resin coating (SEIKABEAM EXF01, manufactured by Dainichiseika Colour & Chemicals Mfg. Co., Ltd.) uniformly in a thickness of about 3 μm, followed by curing by using a ultraviolet lamp of 80 W/cm to prepare a polyester film provided with a hard coat.

Then, using the polyester film provided with a hard coat as a substrate, an antireflection treatment was carried out. At the time of carrying out the antireflection treatment, in order to further increase the adhesion properties between the hard coat treated surface and an antireflection film, a plasma treatment as a sputtering pretreatment was carried out, and on the plasma treated hard coat, a silicon nitride film of 5.0 nm was formed. Then, an antireflection film was formed on the silicon nitride film in the same manner as in Example 1.

The film formation was carried out in such a manner that a boron-doped silicon target for forming a silicon nitride film, a metal titanium target for forming a titanium nitride film and a boron-doped silicon target were disposed in this order in a first vacuum chamber of an inline type sputtering apparatus. In a second vacuum chamber, a boron-doped silicon target for forming a silica film was installed in the same manner as in Example 1, and film formation conditions were the same as in Example 1.

Figure 4:
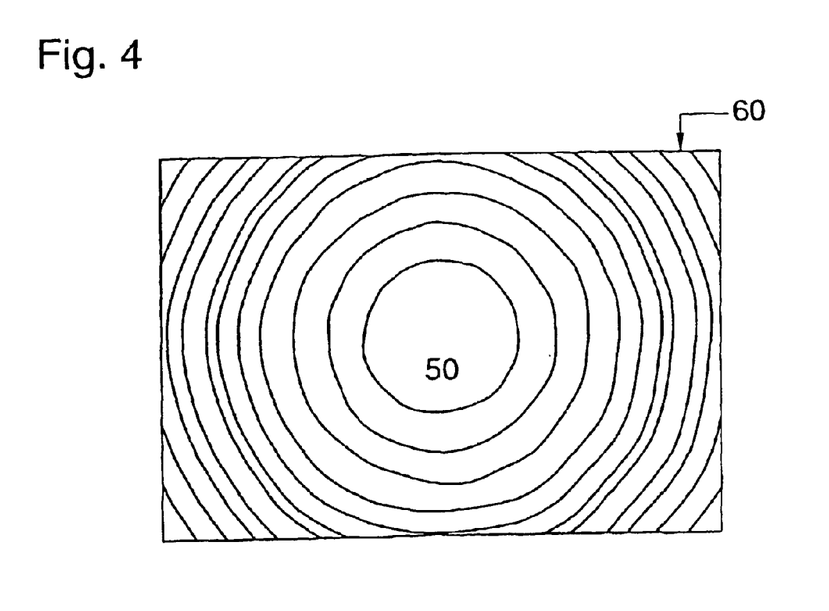
FIG. 4: A diagram illustrating the pattern of a plate for screen printing.

On the side of the obtained film provided with the antireflection film, where the antireflection film was not provided, the colored coating of Example 1 was printed by a silk screen method in the pattern shown in FIG. 4, to obtain a film having a luminous transmittance at the peripheral portion higher than that at the center portion. In FIG. 4, contour lines of the luminous transmittance were drawn, however, the luminous transmittance continuously and gradually changes actually. The numerical value in FIG. 4 is the luminous transmittance of the functional laminated film of the present Example prepared by using this pattern.

Then, a release film on one side of a commercially available transparent adhesive film (AD-ROC, manufactured by Polatechno Co., Ltd.) was peeled, and the adhesive film was bonded to the colorant printed film having an increased luminous transmittance at the peripheral portion obtained by the above method, by means of an adhesive layer while slightly pressing the films with a rubber roll, to prepare the functional laminated film of the present invention.

The luminous transmittance of the functional laminated film of the present invention thus prepared was measured in the same manner as in Example 1. Further, in the same manner as in Example 1, this film was attached to a 17 inch dot matrix flat type CRT, and the brightness distribution was measured in the same manner as in Example 1. The measurement results of the transmittance distribution and the measurement results of the brightness distribution are shown in Tables 1 and 2, respectively.

Practically, the luminous transmittance at the center portion of the film is preferably from 40 to 55%, particularly preferably from 45 to 55%, and the transmittance of the film at the four corner portions of the film is preferably from 55 to 75%, particularly preferably from 60 to 70%. Further, it is preferred that the difference in transmittance between the center portion and the four corner portions is from 10 to 20%.

As mentioned above, it was found that by attaching the functional laminated film of the present invention having a high luminous transmittance at the peripheral portion to a flat type CRT, the irregularity of the brightness was significantly decreased over the entire tube surface.

Here, although there is a difference in the transmittance of light among the center portions in the long axial direction of the film (corresponding to ⑤, ⑥ and ⑦ in FIG. 3) of only about at most 5% as in Examples, there is no problem practically.

INDUSTRIAL APPLICABILITY

The present invention is constituted as mentioned above, and provides the following effects.

Namely, the image of the flat type CRT of the present invention to which the functional laminated film of the present invention is attached, is excellent in uniformity in brightness over the entire surface.

Further, of a panel glass to which the functional laminated film of the present invention is attached, the increase in mass is at a negligible level, and the panel glass has an antireflection effect.

Further, by the production process of the present invention, the functional laminated film having such excellent characteristics can be produced without high productivity.

Further, according to the production process of the present invention, the film can be colored by a coating method, whereby the type can easily be changed at the point of production, and thus the process is suitable for large item small scale production, and the functional laminated film of the present invention can be produced with a high productivity.

TABLE 1

Comparison of transmittance

| Examples | Transmittance of film (%) Measurement position | | | | | | |
|---|---|---|---|---|---|---|---|
| | ① | ② | ③ | ④ | ⑤ | ⑥ | ⑦ |
| Example 1 | 65 | 66 | 67 | 65 | 52 | 50 | 51 |
| Example 2 | 64 | 64 | 66 | 67 | 51 | 50 | 52 |
| Example 3 | 60 | 60 | 60 | 60 | 54 | 50 | 54 |
| Comparative Example | 49 | 49 | 49 | 49 | 49 | 49 | 49 |

TABLE 2

Comparison of brightness of cathode ray tube

| Examples | Measurement position | Relative brightness ratio | | | | | | |
|---|---|---|---|---|---|---|---|---|
| | | ① | ② | ③ | ④ | ⑤ | ⑥ | ⑦ |
| Example 1 | Brightness ratio after attachment of film | 98 | 97 | 97 | 98 | 99 | 100 | 100 |
| Example 2 | Brightness ratio after attachment of film | 97 | 98 | 96 | 99 | 98 | 100 | 98 |

TABLE 2-continued

Comparison of brightness of cathode ray tube

| Examples | Measurement position | Relative brightness ratio | | | | | | |
|---|---|---|---|---|---|---|---|---|
| | | ① | ② | ③ | ④ | ⑤ | ⑥ | ⑦ |
| Example 3 | Brightness ratio after attachment of film | 98 | 99 | 100 | 98 | 99 | 100 | 99 |
| Comparative Example | Brightness ratio before attachment of film | 85 | 84 | 86 | 84 | 95 | 100 | 96 |

Relative evaluation taking brightness (cd/m$^2$) at the center portion ⑥ as 100 in each Example The entire disclosure of Japanese Patent Application No. 2000-80541 filed on Mar. 22, 2000 including specification, claims, drawings and summary is incorporated herein by reference in its entirety.

What is claimed is:

1. A functional laminated film, comprising:

a substrate film, an antireflection layer provided on one side of the substrate film, a colorant layer having a color density distribution provided on the other side of said substrate film, and an adhesive layer laminated on said colorant layer side;

wherein said colorant layer having the color density distribution is obtained by providing a colorant layer having a uniform color density on the other side of said substrate film, irradiating said colorant layer having the uniform color density with ultraviolet rays using a mask having a distribution of a transmission amount of ultraviolet rays, thereby forming said colorant layer having the color density distribution.

2. A functional laminated film, comprising:

a substrate film, an antireflection layer provided on one side of the substrate film, and a colored adhesive layer having a color density distribution provided on the other side of said substrate film;

wherein said colored adhesive layer having a color density distribution is obtained by providing a colored adhesive layer having a uniform color density on the other side of said substrate film, irradiating said colored adhesive layer having the uniform color density with ultraviolet rays using a mask having a distribution of a transmission amount of ultraviolet rays, thereby forming said colored adhesive layer having a color density distribution.

3. A process for producing the functional laminated film as defined in claim 1, which comprises:

providing said antireflection layer on one side of said substrate film, providing said colorant layer having the uniform color density on the other side of said substrate film, irradiating said colorant layer having the uniform color density with ultraviolet rays using said mask having the distribution of the transmission amount of ultraviolet rays to form said colorant layer having a color density distribution, and laminating said adhesive layer on said colorant layer having the color density distribution.

4. A process for producing the functional laminated film as defined in claim 1, which comprises:

providing said antireflection layer on one side of said substrate film, providing said colorant layer having the uniform color density on the other side of said substrate film, laminating said adhesive layer on said colorant layer having the uniform color density, and irradiating said colorant layer having the uniform color density with ultraviolet rays using said mask having said distribution of the transmission amount of ultraviolet rays to form said colorant layer having said color density distribution.

5. A process for producing the functional laminated film as defined in claim 2, which comprises:

providing said antireflection layer on one side of said substrate film, providing said colored adhesive layer having said uniform color density on the other side of said substrate film, and irradiating said colored adhesive layer having the uniform color density with ultraviolet rays using said mask having said distribution of the transmission amount of ultraviolet rays to form said colored adhesive layer having said color density distribution.

6. A process for producing the functional laminated film as defined in claim 2, which comprises:

providing said antireflection layer on one side of said substrate film, providing said colored adhesive layer having said uniform color density on the other side of said substrate film, laminating a release film on said colored adhesive layer having said uniform color density, and then irradiating said colored adhesive layer having said uniform color density with ultraviolet rays using said mask having the distribution of the transmission amount of ultraviolet rays to form the colored adhesive layer having the color density distribution.

7. A CRT comprising the functional laminated film as defined in claim 1 attached thereto.

8. A CRT comprising the functional laminated film as defined in claim 2 attached thereto.

9. The functional laminated film according to claim 1, wherein said substrate film is a polyester film, a polycarbonate film or a triacetate film.

10. The functional laminated film according to claim 1, having a thickness of from 20 to 200 $\mu$m.

11. The functional laminated film according to claim 1, wherein said colorant layer comprises and ultraviolet ray absorbent.

12. The functional laminated film according to claim 1, wherein said substrate film has been treated by a corona discharge, a plasma or a coating with organosiloxane and drying.

13. The functional laminated film according to claim 1, wherein said antireflection layer comprises a light-absorbing film and a low refractive index film.

14. The functional laminated film according to claim 1, wherein said antireflection layer comprises a light-absorbing film, an oxidation barrier film and a low refractive index film.

15. The functional laminated film according to claim 1, having a luminous reflectance to light incident from the antireflection layer side of at most 2%.

16. The functional laminated film according to claim 13, wherein said light-absorbing layer is electrically conductive.

17. The functional laminated film according to claim 1, wherein said light-absorbing film comprises titanium-nitride as main component.

18. The functional laminated film according to claim 13, wherein said low refractive index film has a refractive index of from 1.35 to 1.7.

19. The functional laminated film according to claim 14, wherein said oxidation barrier film has a thickness of from 1 to 20 nm.

20. The functional laminated film according to claim 1, wherein a thickness of the colorant layer having the color density distribution is 0.2 to 5 $\mu$m.

* * * * *